United States Patent [19]

Knowlton

[11] 4,209,842
[45] Jun. 24, 1980

[54] DIGITAL CIRCUITS HAVING NONLINEAR OUTPUT VERSUS INPUT CHARACTERISTICS

[75] Inventor: Kenneth C. Knowlton, Plainfield, N.J.

[73] Assignee: Bell Telephone Laboratories Incorporated, Murray Hill, N.J.

[21] Appl. No.: 939,498

[22] Filed: Sep. 5, 1978

[51] Int. Cl.² .............................................. G06F 15/20
[52] U.S. Cl. .................................... 364/718; 328/144; 364/715
[58] Field of Search ............... 364/718, 719, 710, 715, 364/721, 722, 807, 851, 852, 857, 858, 859, 860; 328/142, 143, 144, 145

[56] References Cited

U.S. PATENT DOCUMENTS

| | | | |
|---|---|---|---|
| 3,627,996 | 12/1971 | Vigour | 235/92 EV |
| 3,729,129 | 4/1973 | Fletcher et al. | 235/92 EV |
| 3,843,873 | 10/1974 | Beville et al. | 235/92 EV |

*Primary Examiner*—Felix D. Gruber
*Attorney, Agent, or Firm*—Harry L. Newman; Hugh L. Logan

[57] ABSTRACT

Unit value increments of two types are counted with the counting process starting anew each time these increments change type. As each count output is produced, it is translated into a second increment where the absolute values of these second increments are unity for at least the first count output after a change in type of the first increment and then become increasingly greater with each count output. Based upon the type of first increment, the second increments are either added or subtracted from an initial number.

8 Claims, 9 Drawing Figures

| GENERATOR 10 OUTPUT | COUNTER 13 OUTPUT | TRANSLATOR 27 OUTPUT | ACCUMULATOR 29 OUTPUT |
|---|---|---|---|
|  |  |  | 1,000 |
| +1 | +1 | +1 | 1,001 |
| +1 | +2 | +1 | 1,002 |
| +1 | +3 | +1 | 1,003 |
| +1 | +4 | +1 | 1,004 |
| +1 | +5 | +2 | 1,006 |
| +1 | +6 | +3 | 1,009 |
| +1 | +7 | +4 | 1,013 |
| +1 | +8 | +5 | 1,018 |
| +1 | +9 | +6 | 1,024 |
| +1 | +10 | +7 | 1,031 |
| +1 | +11 | +8 | 1,039 |
| +1 | +12 | +8 | 1,047 |
| +1 | +13 | +8 | 1,055 |
| −1 | −1 | −1 | 1,054 |
| −1 | −2 | −1 | 1,053 |
| −1 | −3 | −1 | 1,052 |
| −1 | −4 | −1 | 1,051 |
| −1 | −5 | −2 | 1,049 |
| −1 | −6 | −3 | 1,046 |
| +1 | +1 | +1 | 1,047 |
| +1 | +2 | +1 | 1,048 |

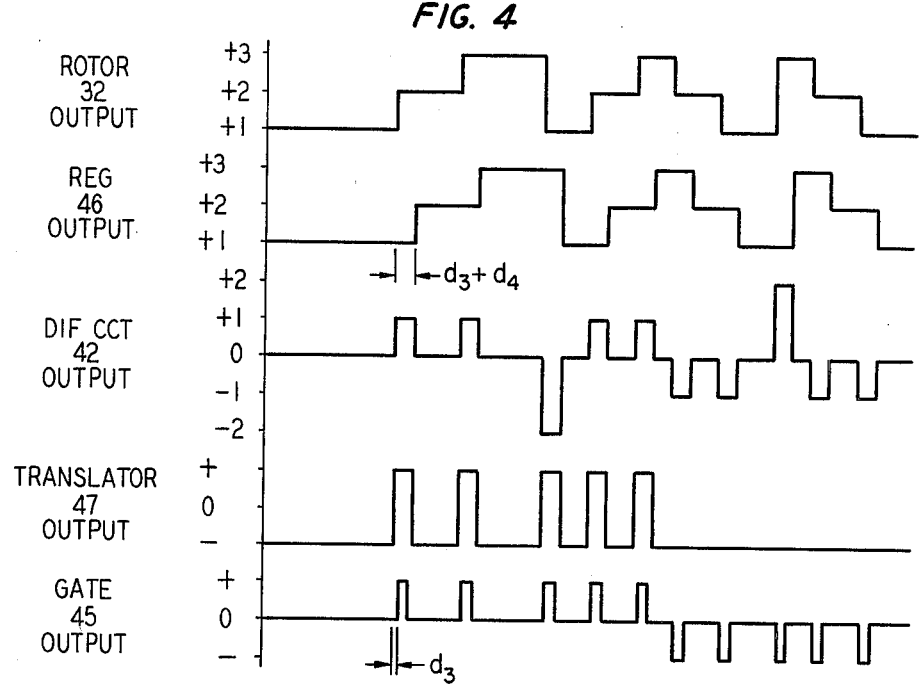
FIG. 4
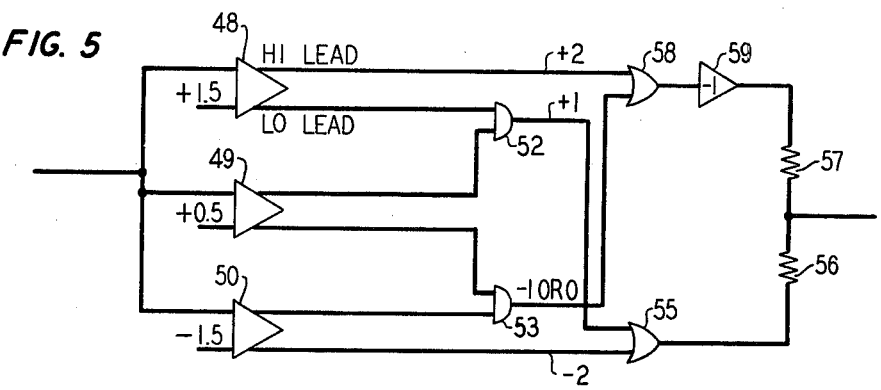
FIG. 5
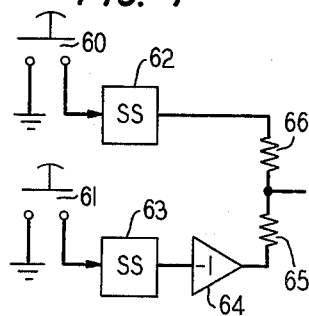
FIG. 6
FIG. 7

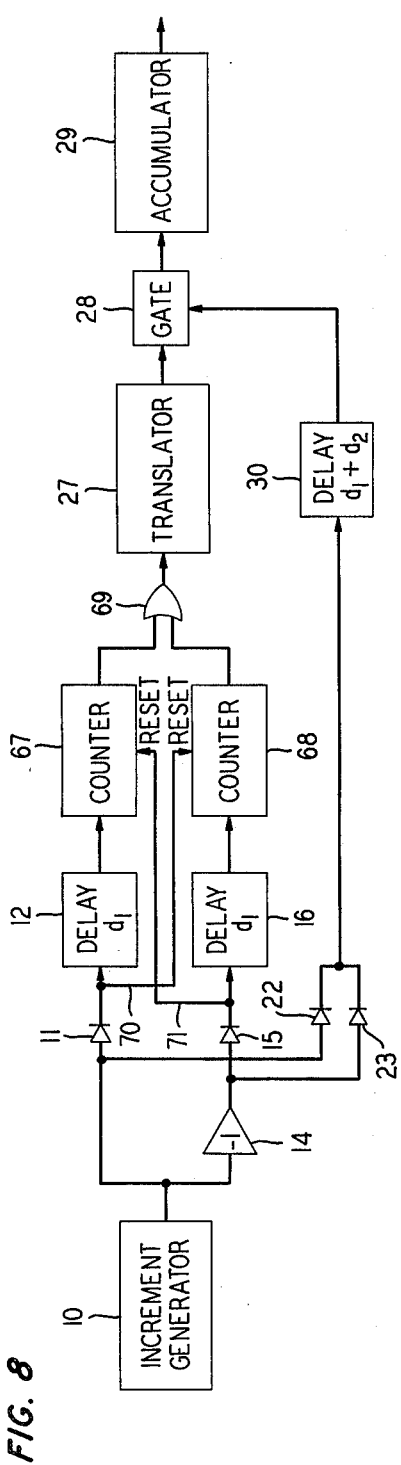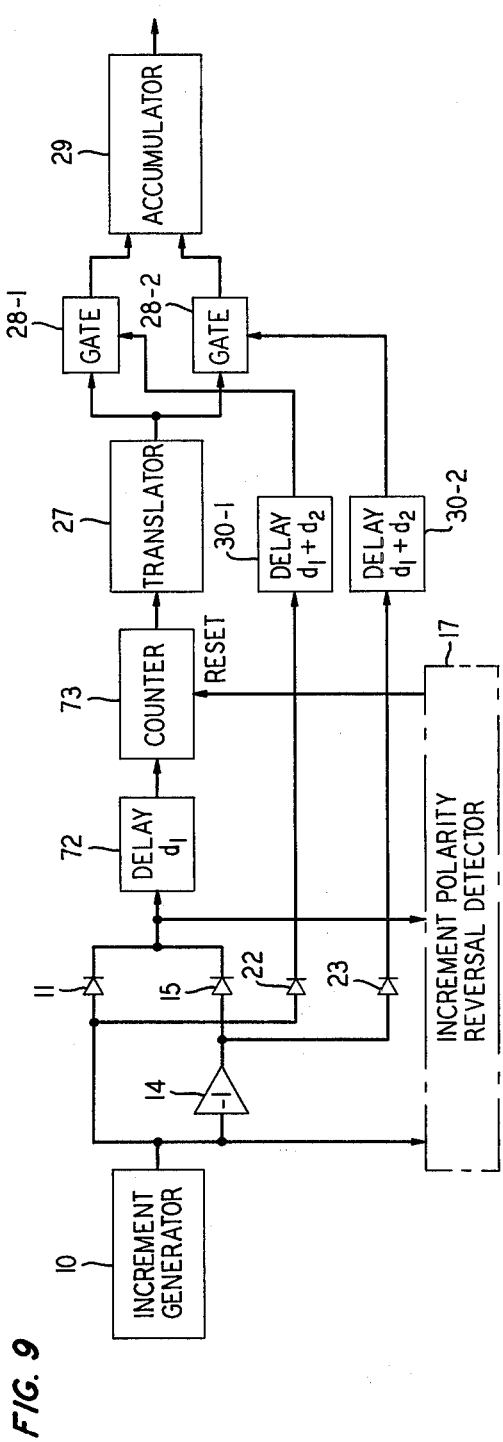
FIG. 8
FIG. 9

DIGITAL CIRCUITS HAVING NONLINEAR OUTPUT VERSUS INPUT CHARACTERISTICS

CROSS-REFERENCE TO RELATED APPLICATION

A patent application entitled "Circuits Having Substantially Parabolic Output Versus Linear Input Characteristics" Ser. No. 939,266 has been filed concurrently herewith by K. C. Knowlton.

BACKGROUND OF THE INVENTION

1. Field of the Invention

This invention relates to input devices for use in display computer terminals.

2. Description of the Prior Art

The "joystick", the "tracker ball" and the Stanford Research Institute "mouse" are typical analog devices used for cursor positioning purposes with digital computer display terminals. These devices, which are described on pages 171 through 174 of *Principles of Interactive Computer Graphics* by W. M. Newman and R. F. Sproull (McGraw-Hill, 1973), typically include potentiometers. To obtain more accurate cursor positioning with such devices, the resolution of any portion of their potentiometers may be temporarily increased by using either of the circuits disclosed in applicant's application Ser. No. 939,266, filed on even date herewith. In particular, when a conventional potentiometer is combined with either of these circuits the output voltage vs. rotation characteristic is parabolic in nature where the parabolic relationship starts anew from the point where rotation of the potentiometer is reversed to provide very high resolution immediately following the reversal. This permits any voltage level within the range available to the potentiometer to be precisely selected, thus improving cursor positioning.

Since digital computers operate in discrete steps, it is frequently necessary to convert the above-described analog voltage into a digital format before it can be utilized. In some instance it may be preferable to produce cursor positioning information directly in a digital format while having a vernier type of action similar to that described above.

SUMMARY OF THE INVENTION

An object of the present invention is to increment in either an increasing or decreasing direction any numerical output within a range of outputs where the incrementing, after a change in the incrementing direction, is of a unit value for at lest one incremental change and of increasingly greater values for at least some of the remaining incremental changes.

This and other objects are achieved by first counting unit value increments of two types with the counting process starting anew each time these unit value increments change types. As each count output is produced, it is translated into a second increment where the absolute values of these second increments are unity for at least the first count output after a change in type of the first increment and then become increasingly greater with each count output. Based upon the type of first increment, the second increments are either added or subtracted from an initial number.

A better understanding of the operation of the invention may be secured by studying the following description of two embodiments.

BRIEF DESCRIPTION OF THE DRAWINGS

In the drawings:

FIG. 4 are typical waveforms associated with the generator of FIG. 3;

FIG. 5 is a block diagram of a translator which may be used in the generator of FIG. 3;

FIG. 6 is a chart showing outputs existing in the translator of FIG. 5 with the various possible inputs therefor;

FIG. 7 is a block diagram of another increment generator which may be used in practicing the invention; and FIGS. 8 and 9 are block diagrams of other embodiments of the invention.

DETAILED DESCRIPTION

Figure 1:
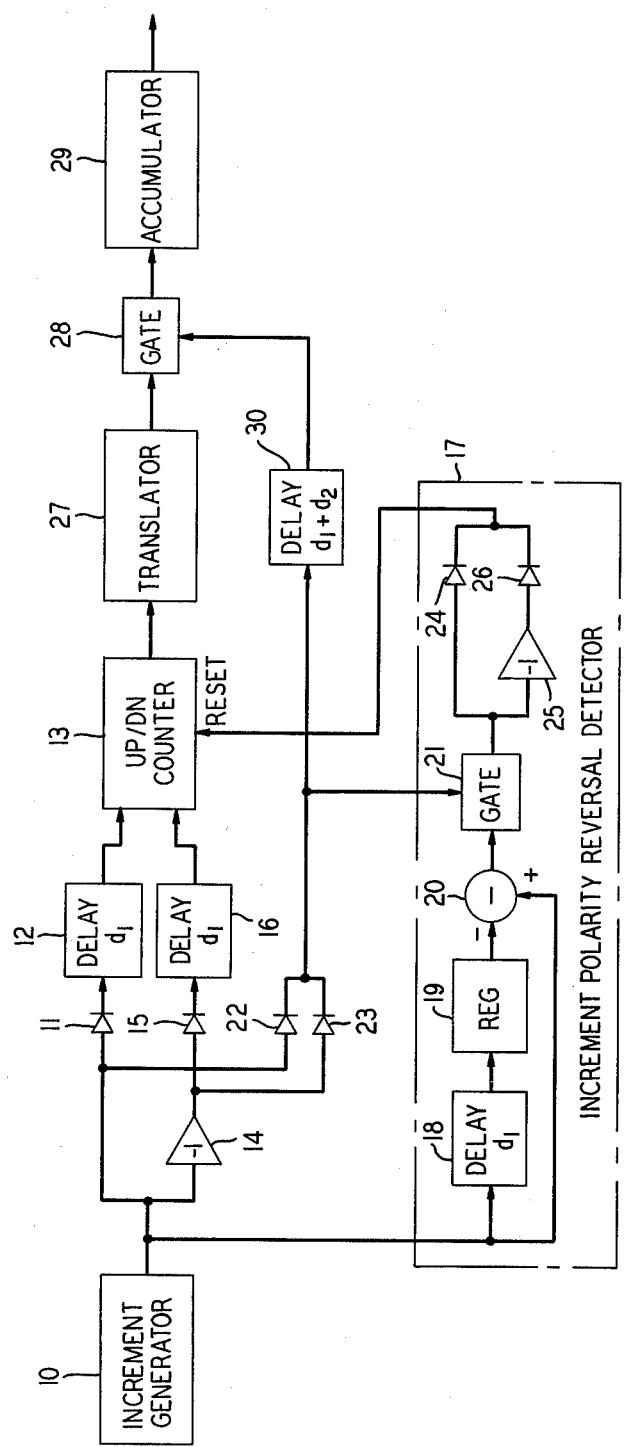
FIG. 1 is a block diagram of one embodiment of the invention.

In the embodiment of FIG. 1, an increment generator 10 produces either positive or negative pulses. (Generators which may be used for this purpose are disclosed in FIGS. 3 and 7 and discussed in detail later herein.) Positive pulses are coupled via a diode 11 and a delay circuit 12 (which introduces a delay of $d_1$ which is greater than the duration of individual outputs from generator 10) to the up-counting input terminal of an up/down counter 13. Negative pulses from generator 10, on the other hand, are inverted by an inverter 14 and coupled via a diode 15 and a delay circuit 16 (which also introduces a delay of interval $d_1$) to the down-counting input terminal of counter 13.

The outputs of generator 10 and the inputs to diodes 11 and 15 are also applied to an increment polarity reversal detector 17, whose output is applied to a reset input terminal of counter 13. Detector 17 comprises a delay circuit 18 having a delay of $d_1$. Circuit 18 delays the output of generator 10 and applies the delayed output to an increment holding register 19. The increment stored in register 19 is applied as the subtrahend to a difference circuit 20. The output of generator 10 is also applied as the minuend to difference circuit 20. When the output of generator 10 has the same polarity as its previous output, the output of circuit 20 is substantially zero for the duration of the output of generator 10. When the output of generator 10 changes polarity, the output of circuit 20 has some finite value for the duration of the output of generator 10 and, furthermore, has either a positive or a negative polarity depending on the nature of the polarity change. The output of circuit 20, during the time of an output from generator 10, is passed by a gate 21 which is enabled by the inputs to diodes 11 and 15 as passed by diodes 22 and 23, respectively. The positive outputs from gate 21 are passed by a diode 24 to the reset input terminal of counter 13 while the negative outputs are inverted by an inverted 25 and passed by a diode 26 to the same reset input terminal. By this arrangement, counter 13 is reset just before a changed-polarity input is applied to the counter.

The output of counter 13 is applied to a translator 27. This translator produces a +1 output for each positive output of counter 13 until a predetermined positive counter output occurs. After that the translator produces outputs which are positively incremented by one with each new positive counter output until a second predetermined positive output is produced, after which the translator produces a constant positive output. This translator also produces a −1 output for each negative counter output until a predetermined negative counter output is produced. After that the translator produces outputs which are negatively incremented by one with each new negative counter output until a second predetermined negative output is produced, after which the translator produces a fixed negative output. The translator may comprise AND circuits, counting circuits and similar logic circuits; configurations of such circuits to perform this translation function are readily realized by those skilled in the art.

The output of translator 27 is passed by a gate 28 to an accumulator 29 after it is certain that the output of translator 27 has settled. In particular, the inputs to diodes 11 and 15 are passed by diodes 22 and 23 to a delay circuit 30 which introduces a delay of $d_1 + d_2$ before applying these inputs to enable gate 28.

Figures 2, 3:
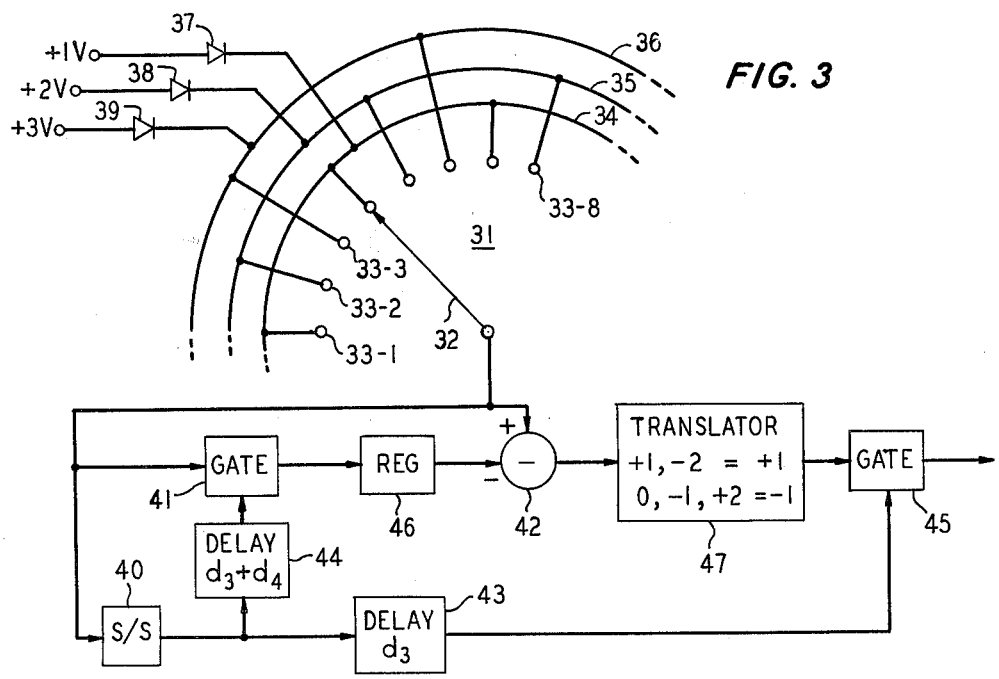
FIG. 2 is a chart illustrating the operation of the embodiment of FIG. 1.
FIG. 3 is a block diagram of an increment generator which may be used in practicing the invention.

The overal operation of the embodiment of FIG. 1 may be understood by referring to FIG. 2 where it has been assumed that translator 27 produces +1 outputs for counter 13 outputs of +1 through +4, +2 through +8 outputs for counter 13 outputs of +5 through +11, respectively, and +8 outputs for all counter 13 outputs in excess of +11. It has also been assumed that translator produces an identical pattern of negative outputs in response to negative inputs. These relatively low levels at which the translator changes its input vs. output relationship have been chosen for demonstration purposes; in practice, these transitional levels would no doubt be greater.

As shown in FIG. 2 each positive output from generator 10 is represented by a +1 while each negative output is represented by a −1. Furthermore it is assumed that accumulator 29 initially produces a output of 1,000 and that it is desired to have it produce an output of 1,048. The first four +1 outputs from generator 10 result in counter 13 counting to +4, translator 27 producing four +1 outputs and accumulator 29 increasing its output to 1,004. The next seven +1 outputs from generator 10 cause counter 13 to count progressively to +11, the output of translator 27 to progressively increase by +1 to +8 and accumulator 29 to accumulate the translator outputs to produce an output of 1,039. The next two +1 outputs of generator 10 result in two additional +8 outputs from translator 27 which increase the accumulator output to 1,055. This is now beyond the desired value of 1,048. At this point, generator 10 begins to produce −1 outputs. After six such outputs, the accumulator output is again below the desired value of 1,048. Generator 10 then produces two +1 outputs which results in the desired accumulator output.

In this particular example, twenty-one outputs were required from generator 10 in order to move the accumulator output from 1,000 to 1,048. Inspection of FIG. 2 shows that fourteen outputs were required to move to 1,054 while fifteen outputs were required to move to 1,053. There is not, therefore, any definite ratio between the increment generator 10 outputs and the amounts the accumulator outputs are moved. Furthermore, for some small moves, the generator outputs required will exceed the move (to proceed from 1,000 to 1,007, for example, requires eight generator outputs). However, embodiments of the invention are intended for those applications where large moves and accurate setting to a particular integer are required. In such applications, rapid and accurate settings are easily achieved.

From FIG. 2 it is apparent that the operation of translator 27 may be explained in other words. In particular, translator 27 produces an absolute-value-of-one output for each output of counter 13 until the counter reaches a first predetermined absolute value output. The translator then produces absolute value outputs which are positively incremented by one for each counter output between the first predetermined absolute value and a second predetermined absolute value, after which the absolute value of the translator output remains constant for absolute value outputs of the counter in excess of the second predetermined value. Furthermore, in the instant embodiment, information with respect to the type of output for generatore 10 is carried through counter 13 and translator 27 and appears in the polarity sign applied to the translator output. As will become apparent in the discussion with respect to the embodiment of FIG. 9, this latter information may be made available to accumulator 29 by other means.

Increment generatore 10 may comprise the structure shown in FIG. 3. The structure includes a rotary make-before-break switch generally identified as 31 which has a rotor 32 and a plurality of contacts 33-1, 33-2, 33-3, . . . Although only a portion of the contacts are shown, the total number of contacts is equal to some multiple of three. Furthermore, these contacts are electrically joined together to form three groups. In particular, contacts 33-1, 33-4, 33-7, . . . are joined together by a wire assembly 34; contacts 33-2, 33-5, 33-8, . . . are joined together by a wire assembly 35, and contacts 33-3, 33-6. 33-9, . . . are joined together by wire assembly 36. Wire assemblies 34, 35 and 36 are connected by way of diodes 37, 38 and 39, respectively, to +1, +2 and +3 volt sources. When rotor 32 is rotated clockwise, the voltage on the rotor progresses in a . . . +1, +2, +3, +1, +2, . . . sense. On the other hand, counterclockwise rotation produces a . . . +3, +2, +1, +3, +2, . . . output. This same result can be achieved when rotary switch 31 has its minimum number (i.e., three) of contacts.

The voltages on rotor 32 are applied to a single-shot multivibrator 40, a gate 41 and the minuend input terminal of a difference circuit 42. Multivibrator 40 responds to either a positive-going or negative-going voltage change to produce an output pulse of a predetermined duration. This pulse is applied to a delay circuit 43 having a delay of $d_3$ and a delay circuit 44 having a delay of $d_3 + d_4$. The output of delay circuit 43 is applied as an enabling input to a gate 45 while the output of delay circuit 44 is applied as an enabling input to gate 41. When enabled, gate 41 places the output of rotor 32 in a register 46 whose output is applied to the subtrahend input terminal of difference circuit 42. The output of difference circuit 42 is applied to a translator 47 which produces a positive voltage output in response to input voltages of +1 or −2 volts and a negative voltage output in response to input voltage of zero, −3 or +2 volts. (Circuitry that may be used for this purpose is disclosed in FIG. 5 and is discussed later herein.) The output of translator 47 is applied to gate 45.

The operation of the structure of FIG. 3 is now considered in conjunction with the waveforms in FIG. 4. In FIG. 4, rotor 32 was first rotated clockwise to produce outputs +1, +2, +3, +1, +2, and +3. The rotor was then rotated counterclockwise to produce outputs +2, +1, +3, +2, +1. Each time a change occurred, difference circuit 42 produced an output equal to the difference between the latest rotor output and the previous rotor output stored in register 46. At the same time, multivibrator 40 was triggered and its output, delayed by interval $d_3 + d_4$, was applied to gate 41 to place the latest rotor output into register 46, at which time difference circuit 42 output returned to zero. Difference circuit 42 outputs therefore comprise levels of zero, +1, +2, −1, and −2 volts. Translator 47 transalated +1 and −2 input volts to a positive potential output and zero, −1 and +2 input volts to a negative potential output. These outputs were sampled by gate 45 in response to the output of multivibrator 40 delayed by interval $d_3$ to produce positive pulses for clockwise rotation of rotor 32 and negative pulses for counter-clockwise rotation of rotor 32.

Translator 47 of FIG. 3 may take the form of the circuit shown in FIG. 5. The input to the translator is applied to one input of each of three differential amplifiers 48, 49 and 50. To the second inputs of amplifiers 48, 49 and 50 are applied reference voltages +1.5, +0.5 and −1.5 volts, respectively. In the following discussion, the output leads of each amplifier are identified as a HI LEAD and a LO LEAD as shown with respect to amplifier 48. Furthermore, when the translator input voltage to an amplifier exceeds, in a positive polarity sense, its reference input voltage, the amplifier HI LEAD is considered to be at a high level while its LO LEAD is at a low level. The relationships of the various input voltages and the voltage levels on the amplifier output leads is shown in FIG. 6 wherein a "1" represents a high output level and a "0" represents a low output level.

The various amplifier outputs in FIG. 5 are coupled to a pair of AND gates 52 and 53. Each of these gates produces a low level output unless both of its inputs are at a high level. Inspection of the connections in FIG. 5 will show that gates 52 and 53 produce high outputs for +1 and −1 or 0 volt inputs, respectively, to amplifiers 48, 49, and 50. The outputs of gate 52 and the LO LEAD on amplifier 50 are applied via an OR gate 55 to one input of a summing circuit comprising resistor 56 and 57 while the outputs of gate 53 and the HI LEAD on amplifier 48 are applied via a OR gate 58 and an inverter 59 to the other input of the summing circuit. As a result of this logic circuitry, positive outputs are produced for +1 and −2 volt inputs and negative outputs are produced from −1, 0 and +2 volt inputs as required by translator 47 in the generator of FIG. 3.

Generator 10 need not be as complex as the generator shown in FIG. 3. It may, for example, comprise a pair of pushbuttons 60 and 61, a pair of single-shot multivibrators 62 and 63, an inverter 64 and a summing circuit comprising resistors 65 and 66 connected together as shown in FIG. 7. Both multivibrators produce pulses of the same polarity as, for example, positive pulses. In this case, operation of pushbutton 60 results in a positive pulse output while operation of button 61 results in a negative pulse output. Although this structure is simpler than that of FIG. 3, it does not have a single control feature (i.e., a knob associated with rotor 32) of FIG. 3, and may be found by some operators to be less desirable notwithstanding its simplicity.

Another embodiment of the invention is shown in FIG. 8. Many of the elements are identical to those shown in the embodiment of FIG. 1 and consequently have been identified by the same symbols. The basic differences between the two embodiments are in the counter configuration and the means for resetting the counters. The counter configuration of FIG. 8 comprises a pair of counters 67 and 68 for counting positive and negative inputs, respectively, and an OR gate 69 for combining the counter outputs (in practice, gate 69 would, as appreciated by those skilled in the art, comprise a plurality of OR gates for combining like digits in the counter outputs). Increment polarity reversal detection for resetting the counters is achieved in this embodiment by simply using leads 70, 71 to apply the positive input pulses (undelayed) to reset the negative pulse counter and the inverted negative input pulses (undelayed) to reset the positive pulse counter.

Still another embodiment of the invention is shown in FIG. 9. Many of the elements are identical to those shown in the embodiments of FIG. 1 and consequently have been identified by the same symbols. A difference is that the outputs of diodes 11 and 15 are combined and fed through a common delay circuit 72 to a conventional counter 73. Counter 73 is reset by increment polarity reversal detector 17 each time the outputs from generatore 10 change type. The outputs from counter 73 therefore represent the numbers of consecutive outputs of each type produced by generator 10. The counter outputs, however, are devoid of any information with respect to the type of generator 10 output. The second difference in this embodiment in that such information is carried forward by the individual outputs of diodes 22 and 23 being delayed in delay circuits 30-1 and 30-2 and applied as enabling inputs to gates 28-1 and 28-2, respectively. These gates, when enabled, pass the translator outputs to one of two input terminals of accumulator 29. When applied to one of these input terminals, the accumulator output is increased by the translator output. On the other hand, when applied to the other accumulator input terminal, the accumulator output is decreased by the translator output.

What is claimed is:

1. In combination
    first means for producing increments of either a first or a second type,
    second means for counting said increments and for producing outputs equivalent to counts of said increments,
    third means for resetting said second means each time said increments from said first means change type,
    fourth means for producing outputs having a predetermined relationship with respect to said outputs from said second means, said fourth means outputs being nonlinear with respect to a portion of said second means outputs, and
    fifth means for accumulating in a positive sense said fourth means outputs caused by said first type increments and in a negative sense said forth means outputs caused by said second type increments.

2. A combination in accordance with claim 1 in which
    said fourth means, each time after said second means in reset, produces a constant absolute value output for each output of said second means until said second means reaches a predetermined absolute count and then produces absolute value outputs which are incremented by a predetermined amount with each additional output for said second means until said second means reaches a second predetermined absolute count, after which said forth means produces the same absolute value output for each second means output thereafter until said second means is reset.

3. A combination in accordance with either claims 1 or 2 in which
said secod means comprises an up/down counter where said increments of the first type cause said counter to count up and said increments of the second type cause said counter to count down.

4. A combination in accordance with either of claims 1 or 2 in which
said second means comprises first and second counters where said first counter counts in response to said increments of the first type and said second counter counts in response to said increments of the second type.

5. A combination in accordance with either of claims 1 or 2 in which
said second means comprises a counter for counting increments of either type from said first means and
said fifth means has a positive incrementing input which receives said fourth means outputs produced by said first means increments of the first type and a negative incrementing input which receives said fourth means outputs produced by said first means increments of the second type.

6. A combination in accordance with either of claims 1 or 2 in which
said first means comprises a positive voltage source and a negative voltage source and switching means for momentarily enabling either of said sources.

7. A combination in accordance with either of claims 1 or 2 in which
said first means comprises a rotary switch assembly which produces the first type increment each time it is rotated to its next position in a clockwise direction and the second type increment each time it is rotated to its next position in a counterclockwise direction.

8. A combination responsive to a series of increments where the increments are of either a first or a second type to produce, when said increments change types and for as long as one type persists, a cumulative output which changes with each increment in a linear manner for a predetermined number of increments and then in a nonlinear manner for a second predetermined number of increments, said combination comprising
first means for counting said increments and for producing outputs equivalent to counts of said increments,
second means for resetting said first means each time said increments change from one of said types to the other of said types,
third means for producing outputs having a predetermined relationship with respect to outputs from said first means said third means outputs being nonlinear with respect to a portion of said first means outputs, and
fourth means for accumulating in a positive sense said third means outputs caused by said increments of the first type and in a negative sense said third means outputs caused by said increments of the second type.

* * * * *